June 19, 1934.  C. H. NEHLS  1,963,143
TIRE COVER
Filed Aug. 11, 1930
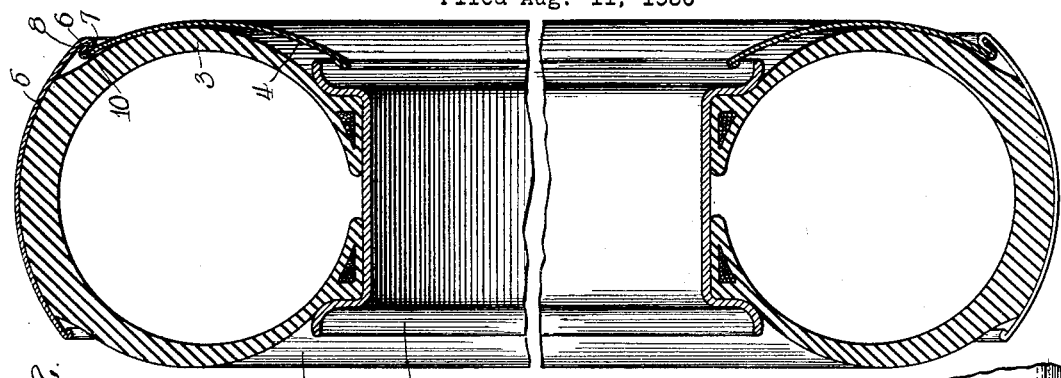
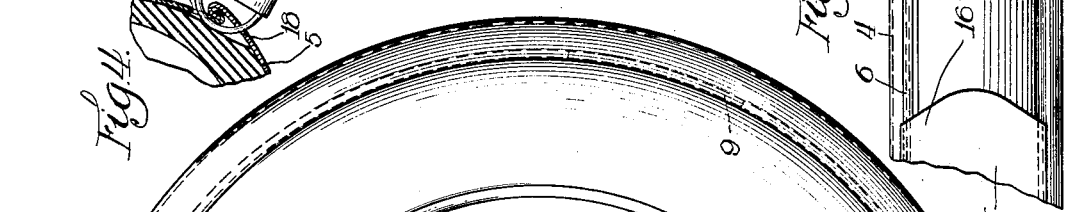
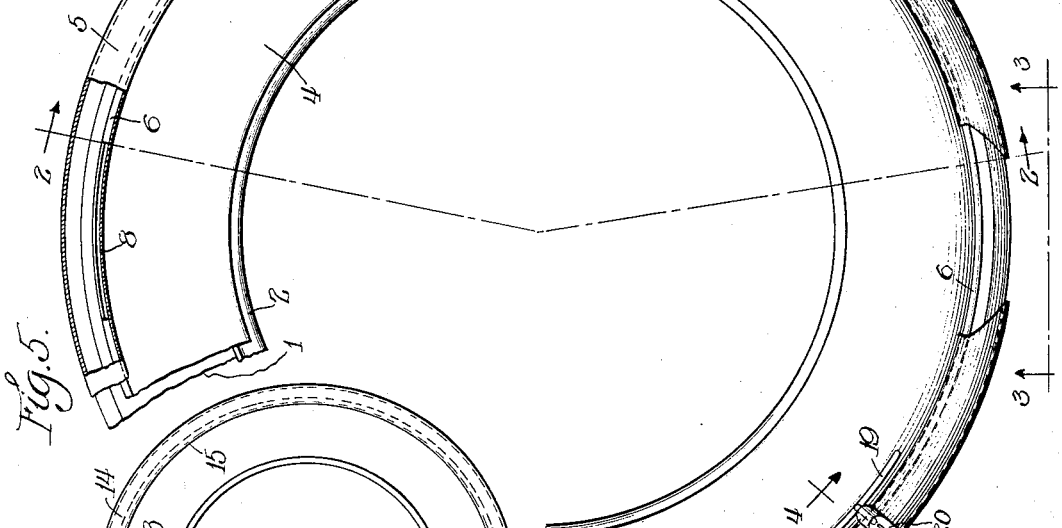
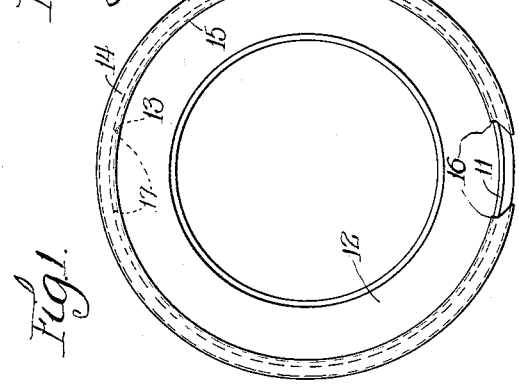
Inventor:—
Charles H. Nehls Patented June 19, 1934

1,963,143

UNITED STATES PATENT OFFICE 1,963,143

TIRE COVER

Charles H. Nehls, Detroit, Mich., assignor, by mesne assignments, to Lyon Cover Company, Detroit, Mich., a corporation of Michigan Application August 11, 1930, Serial No. 474,613

7 Claims. (Cl. 150—54)

This invention has to do with tire covers and has for one of its objects to provide a tire cover comprising a pair of members one of which serves to retain both on a tire, wherein the members are interlocked to discourage removal from the tire. A further object resides in the provision of means for rendering a two-part tire cover theft-proof.

Further objects will appear as the description proceeds.

In the accompanying drawing:

Figure 1 illustrates one form of my improved tire cover applied to a tire,

Figure 2 is an enlarged sectional view taken as indicated by the line 2—2 of Figure 5.

Figure 3 is an enlarged fragmentary view taken approximately as indicated by the line 3—3 of Figure 5.

Figure 4 is an enlarged fragmentary sectional view showing the locking feature along line 4—4 of Figure 5, and Figure 5 is a fragmentary elevational view illustrating certain features of another form of my invention, certain parts being shown in section.

Referring more particularly to the drawing, reference numeral 1 indicates a tire encompassing a rim 2. One wall 3 of the tire is enclosed by an annular curved plate 4 which is adapted for interlocking engagement with an incomplete ring member 5. The members 4 and 5 constitute the tire cover, and are self-retaining by a means now to be described. The plate 4 is provided at its outer periphery with a lip 6 and the ring member 5 is provided with a corresponding inturned portion or lip 7 adapted for locking engagement as clearly shown in Fig. 2. The ring member 5 is preferably resilient and is adapted to exert tension to maintain the lips 6 and 7 in tight inter-engagement at all times.

I have provided novel means whereby the said lips 6 and 7 may be made to interlock. To this end lip 6 is cut away at a plurality of preferably equally spaced places 8 and the lip 7 is provided with correspondingly spaced and sized cutouts 9 to thereby form lugs 10 of commensurate size with the recesses 8 in the lip 6. In connecting the two cover members so as to cover the tire 1, it is necessary merely to place the side plate 4 in the position shown in the various figures, this being easily accomplished when the tire is lying substantially horizontal upon a support, and positioning the outer ring 5 around the tread of the tire with its lugs 10 entered into the recesses 8 of the lip 6. The members 4 and 5 are then subjected to relative rotation to interlock the two lips 6 and 7 against lateral separation. The resilient property of the ring 5 will serve to tightly maintain both members 4 and 5 on the tire without rattling and it is thus impossible to remove the complete cover from the tire without first subjecting the parts of the cover to relative rotation sufficiently to permit removal of the lugs 10 from the corresponding recesses 8.

The form of invention thus far described is illustrated in Figures 2 and 5. However, my invention may take another form as illustrated in Figure 1, wherein the lip 11 of the plate member 12 is continuous with the exception of the cut away portion 13, and the outer resilient ring 14 is provided with a corresponding lip 15 which is unmutilated. The manner of attachment and removal of this cover is similar to that employed with the cover above described. Specifically, one end 16 of the lip 15 is positioned adjacent an end 17 of the space 13 and is entered under the lip 15 as the ring 14 is rotated relative to the plate member 12. The operation is very similar to that involved in inserting a wire into a tube through a hole in the wall of the tube. The relative rotation is continued for slightly more than a turn until the entire lip 15 is inter-locked with the lip 11, and the lip 15 conceals the cut away portion 13. Preferably, though not necessarily, the rotation is continued until the ends 16 are substantially diametrically opposite the space 13. With this arrangement the act of unauthorized separation of the cover parts is made difficult by reason of the concealment of the interlocking parts and the space 13.

The description thus far has dealt with a detachable interlocking arrangement of the cover parts, the interlocking portions being concealed. If desired positive locking means may be employed to prevent separation of the cover parts by unauthorized persons and to render the complete cover theft-proof from the tire. To this end one of the cover parts is provided near its lip with an opening 18 and the other with a substantially arcuate slot 19, located adjacent its lip. While in this description the opening 18 is located in the ring member and the slot in the side plate, this arrangement could easily be reversed. A padlock 20 by means of its bow 21 passing through the opening and slot as clearly shown in Figures 4 and 5, serves to positively lock the members together. The slot 19 is made of sufficient length to permit passage through the opening and said slot of the bow 21 for a variety of positions of the ring members relative to the side plate.

The locking means embodying the padlock 20 is intended solely for illustrative purposes, since I consider it well within the province of my invention to employ any other theft-proof instrumentalities to accomplish the same purpose.

It is to be understood that the arrangement of recesses in the side plate and lugs on the corresponding ring may be reversed without departing from the scope of this invention. It will be noted, moreover, that the resilience of the outer ring 5, 14, renders the same adaptable to tires of various sizes and consequently adaptable for use with various sizes of side plate 4, 12.

It is evident that I have provided a novel interlocking feature incorporated with a tire cover whereby the cover may be tightly held in place on a tire, the interlocking parts being entirely hidden from view. While the neat appearance of the cover is a desideratum, it is nevertheless to be appreciated that a positive locking means incorporated in the interlocked tire cover as described may prove desirable and for that reason provision is made for its use. As set forth above, positive locking means other than that herein described may be employed and it must be appreciated that whatever the locking means employed, it may be arranged so as not to interfere with the presentable appearance of the cover.

While I have illustrated and described certain preferable embodiments of the principle of my invention, I do not wish to be limited to the structural details shown and described but, on the contrary, reserve unto myself other structural forms which may embody the described principles.

I claim:

1. A multi-part tire cover for protecting a spare tire including a circular metal side plate structure for disposition over a side wall of the tire, a resilient split circular rim for disposition over the tire tread formed to extend about more than one-half the periphery of the tire and cooperating with said side plate structure to retain the same in proper position on the tire, and means connecting portions of an outer marginal edge of said side plate structure to portions of the adjoining marginal edge of the rim, the remainder of said rim edge being free of said side plate structure.

2. A multi-part tire cover for protecting a spare tire including a circular metal side plate structure for disposition over a side wall of the tire, a resilient split circular rim for disposition over the tire tread formed to extend about more than one-half the periphery of the tire and cooperating with said side plate structure to retain the same in proper position on the tire, and means connecting portions of an outer marginal edge of said side plate structure to portions of the adjoining marginal edge of the rim, the remainder of said rim edge being free of said side plate structure, each set of said connected portions being spaced apart from adjacent sets of said portions to permit said portions to be disconnected by relative rotation of said rim and side plate structure whereby the latter may be separately removed from the tire.

3. A multi-part tire cover for protecting a spare tire including a circular metal side plate structure for disposition over a side wall of the tire, a resilient split circular rim for disposition over the tire tread formed to extend about more than one-half the periphery of the tire and cooperating with said side plate structure to retain the same in proper position on the tire, and means connecting portions of an outer marginal edge of said side plate structure to portions of the adjoining marginal edge of the rim, the remainder of said rim edge being free of said side plate structure, said rim and side plate structure being relatively rotatable to disconnect said portions so that the rim and side plate may be separately removed from the tire.

4. A multi-part tire cover for protecting a spare tire including a circular metal side plate structure for disposition over a side wall of the tire, a resilient split circular rim for disposition over the tire tread formed to extend about more than one-half the periphery of the tire and cooperating with said side plate structure to retain the same in proper position on the tire, and means for connecting an outer marginal edge of said side plate structure to the adjoining marginal edge of the rim, said means being made effective to secure said rim and side plate structure together on the tire by the relative rotation of said rim and side plate structure said rim being split so that it may resiliently exert pressure on the tire and side plate.

5. A multi-part tire cover for protecting a spare tire including a circular metal side plate structure for disposition over a side wall of the tire, a resilient split circular rim for disposition over the tire tread formed to extend about more than one-half the periphery of the tire and cooperating with said side plate structure to retain the same in proper position on the tire, means for connecting an outer marginal edge of said side plate structure to the adjoining marginal edge of the rim, said means being made effective to secure said rim and side plate structure together on the tire by the expansion and contraction of said split rim into position over the outer of said plate and then by the relative rotation of said rim and side plate structure, and means for locking said rim and side plate structure against relative rotation after they have been secured together.

6. A multi-part tire cover for protecting a spare tire including a circular metal side plate structure for disposition over a side wall of the tire, a resilient split circular rim for disposition over the tire tread formed to extend about more than one-half the periphery of the tire and cooperating with said side plate structure to retain the same in proper position on the tire, means for connecting an outer marginal edge of said side plate structure to the adjoining marginal edge of the rim, said means being made effective to secure said rim and side plate structure together on the tire by the relative rotation of said rim and side plate structure, and means for locking said rim and side plate structure against relative rotation after they have been secured together, said latter means extending through slots in said rim and side plate structure and transversely around said connecting means.

7. In an annular tire cover of relatively resilient sheet metal, an annular face piece with a combined tread and rear piece of channeled cross-section connected at spaced points thereto, the tread and rear piece being coterminous and arcuate and greater than a semi-circle in length, a substantial portion of the edge of the tread and rear piece being secured to a portion of the face piece, the remaining portion of the edge of the tread and rear piece being free of the face piece so as to permit relative movement of the pieces.

CHARLES H. NEHLS.

CERTIFICATE OF CORRECTION.

Patent No. 1,963,143.  June 19, 1934.

CHARLES H. NEHLS.

It is hereby certified that error appears in the printed specification of the above numbered patent requiring correction as follows: Page 2, line 114, claim 5, after "outer" insert edge; and that the said Letters Patent should be read with this correction therein that the same may conform to the record of the case in the Patent Office.

Signed and sealed this 7th day of August, A. D. 1934.

Leslie Frazer (Seal)  Acting Commissioner of Patents.